United States Patent
Sen et al.

(10) Patent No.: US 10,917,667 B1
(45) Date of Patent: Feb. 9, 2021

(54) PERCEPTUAL VISUAL QUALITY VIDEO CHUNK SELECTION

(71) Applicant: AT&T Intellectual Property I, L.P., Atlanta, GA (US)

(72) Inventors: Subhabrata Sen, Westfield, NJ (US); Krishna R. Pattipati, Storrs, CT (US); Bing Wang, Storrs Mansfield, CT (US); Yanyuan Qin, Tolland, CT (US)

(73) Assignees: AT&T Intellectual Property I, L.P., Atlanta, GA (US); The University of Connecticut, Farmington, CT (US)

(*) Notice: Subject to any disclaimer, the term of this patent is extended or adjusted under 35 U.S.C. 154(b) by 0 days.

(21) Appl. No.: 16/560,636

(22) Filed: Sep. 4, 2019

(51) Int. Cl.
*H04N 21/234* (2011.01)
*H04N 21/2662* (2011.01)
*H04N 21/231* (2011.01)
*H04N 21/643* (2011.01)

(52) U.S. Cl.
CPC ..... *H04N 21/23418* (2013.01); *H04N 21/231* (2013.01); *H04N 21/2662* (2013.01); *H04N 21/643* (2013.01)

(58) Field of Classification Search
CPC ........... H04N 21/23418; H04N 21/231; H04N 21/2662; H04N 21/643; H04N 21/8456; H04N 21/26606; H04N 21/4307; H04N 21/4325; H04N 21/4623; H04N 21/812; H04N 21/8133; H04N 21/8402; H04N 21/23; H04N 21/232; H04N 21/2323; H04N 21/235; H04N 21/2353; H04N 21/236; H04N 21/238; H04N 21/242; H04N 21/43; H04N 21/4302; H04N 21/4305; H04N 21/4621; H04N 21/23439; H04N 21/435; H04N 21/47202; H04N 7/165
See application file for complete search history.

(56) References Cited

U.S. PATENT DOCUMENTS

| | | | |
|---|---|---|---|
| 2009/0300204 A1* | 12/2009 | Zhang | H04N 21/6373 709/231 |
| 2016/0205399 A1* | 7/2016 | Walls | H04N 19/186 375/240.02 |
| 2018/0262813 A1* | 9/2018 | Moorthy | H04N 21/23439 |

OTHER PUBLICATIONS

Qin, Yanyuan et al., "Quality-aware Strategies for Optimizing ABR Video Streaming Qo-E and Reducing Data Usage", In 10th ACM Multi-media Systems Conference (MMSys '19) Jun. 18-21, 2019, Amherst, MA, USA, 12 pages.

* cited by examiner

*Primary Examiner* — Alexander Gee

(57) ABSTRACT

Devices, computer-readable media, and methods for selecting a video chunk from among a plurality of video chunks associated with a first time block of a video in accordance with a designated perceptual visual quality are disclosed. For instance, a processing system including at least one processor may obtain a selection of a designated perceptual visual quality for a video, select a video chunk from among a plurality of video chunks associated with a first time block of the video, based upon a manifest file of the video, where the video chunk is selected in accordance with the designated perceptual visual quality, and where each of the plurality of video chunks is associated with a respective perceptual visual quality. The processing system may further obtain the video chunk from a server and record the video chunk in a buffer.

20 Claims, 3 Drawing Sheets

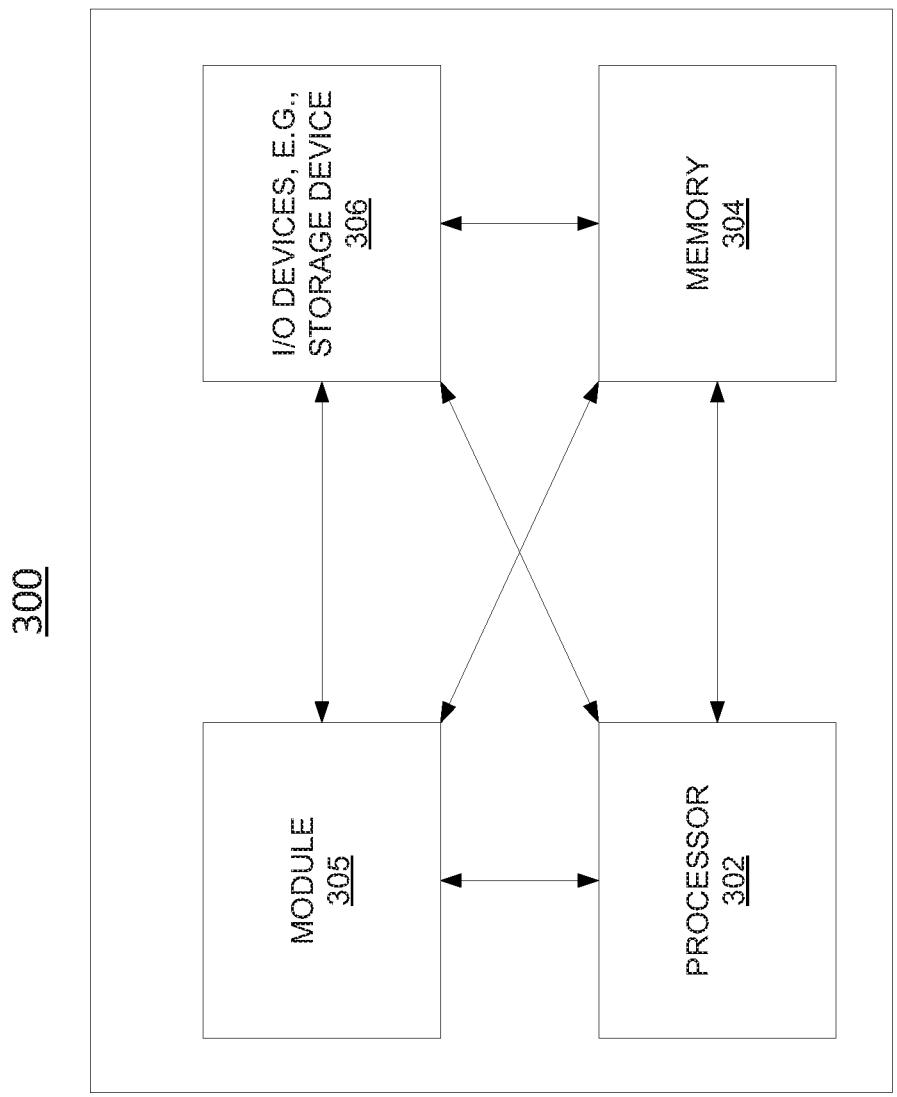

PERCEPTUAL VISUAL QUALITY VIDEO CHUNK SELECTION

The present disclosure relates generally to adaptive video streaming, and more particularly to devices, non-transitory computer-readable media, and methods for selecting a video chunk from among a plurality of video chunks associated with a first time block of a video in accordance with a designated perceptual visual quality.

BRIEF DESCRIPTION OF THE DRAWINGS

The teachings of the present disclosure can be readily understood by considering the following detailed description in conjunction with the accompanying drawings, in which:

FIG. 3 illustrates a high level block diagram of a computing device or system specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
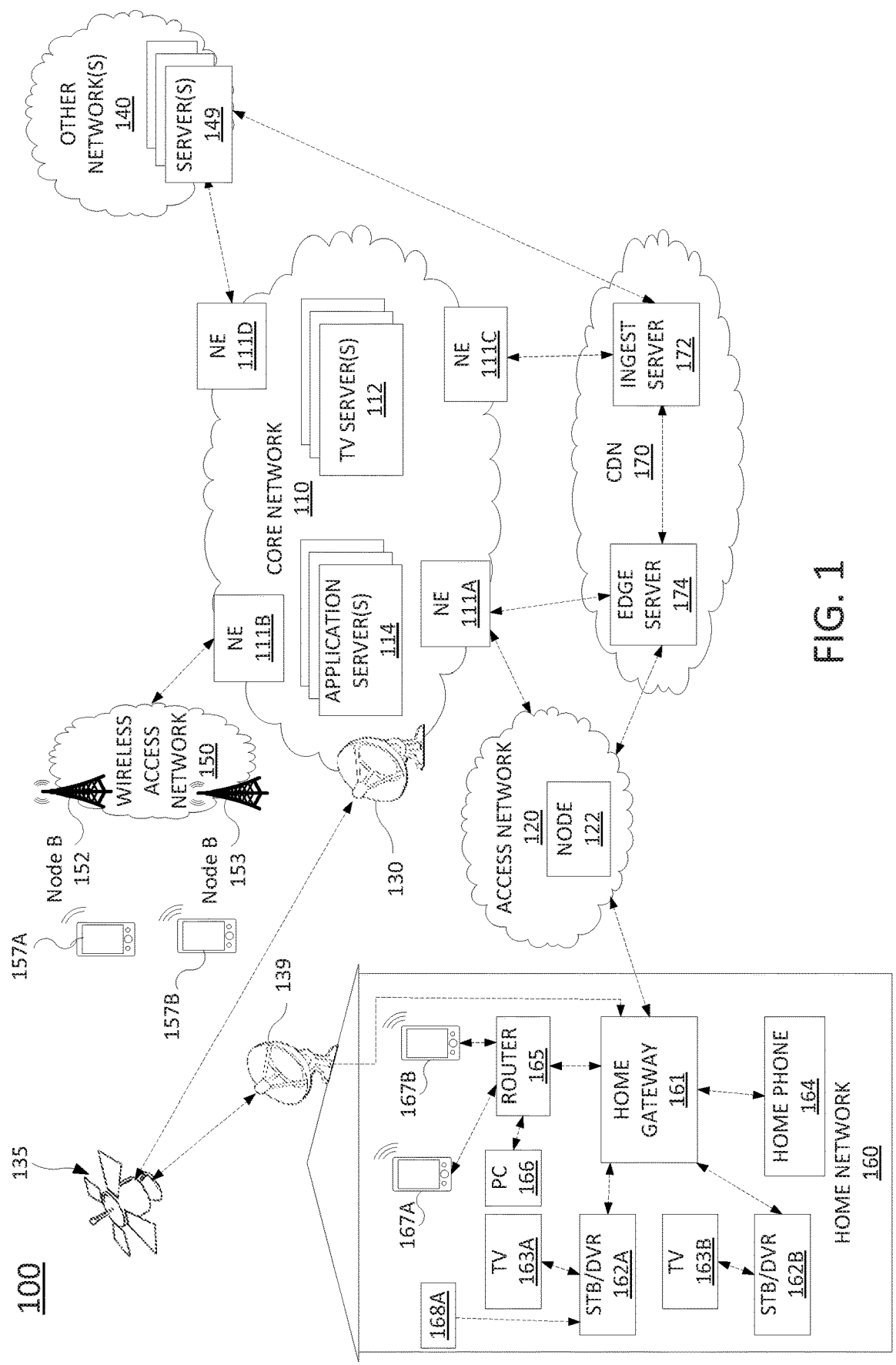
FIG. 1 illustrates an example network related to the present disclosure.

In one example, the present disclosure describes a device, computer-readable medium, and method for selecting a video chunk from among a plurality of video chunks associated with a first time block of a video in accordance with a designated perceptual visual quality. For instance, a processing system including at least one processor may obtain a selection of a designated perceptual visual quality for a video, select a video chunk from among a plurality of video chunks associated with a first time block of the video, based upon a manifest file of the video, where the video chunk is selected in accordance with the designated perceptual visual quality, and where each of the plurality of video chunks is associated with a respective perceptual visual quality. The processing system may further obtain the video chunk from a server and record the video chunk in a buffer.

Video delivery technology has shifted from legacy protocols, such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the availability of video in multiple chunks associated with each time block of a video and having different encoding bitrates, with the chunks linked together by a manifest file, or "index file" (also referred to as a "media presentation description" (MPD) in DASH) that defines all of the variants/tracks (e.g., respective sets of chunks, each set at a different bitrate/ encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

For a time block of an adaptive bitrate video, there may be multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/ indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, home television, game console, web browser, etc. may choose which video rate to stream by monitoring network conditions and estimating the available network capacity.

The function of the ABR algorithm is to select ABR variants (called representations in DASH) in real time to maximize video quality and minimize re-buffering events. For example, a video client maintains a media cache (also referred to as a "buffer" or "video buffer"), by pre-fetching video chunks; then playback occurs from the cache. For each time block of a video-on-demand (VoD) program/live channel, the video client selects which variant (chunk) of that time block to download into the cache. Higher quality chunks for a given time block are larger in size (data volume) and take longer to download than lower quality chunks. In general, the goal is to download as high quality a chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, i.e., to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected. This ensures conservative behavior, e.g., selecting minimum quality/chunk size, when the buffer is low, i.e., filling the buffer more quickly using a chunk of a lower variant, and aggressive behavior, e.g., selecting maximum quality/chunk size, when the buffer is full or nearly so, i.e., filling the buffer more slowly using a chunk of a higher variant.

Streaming videos over cellular networks is challenging due to highly dynamic network conditions. While ABR video streaming strategies focus on maximizing the QoE, opportunities to reduce the associated data usage may be overlooked. Since mobile data is a relatively scarce resource, some video and network providers offer options for users to exercise control over the amount of data consumed by video streaming. However existing data saving practices for ABR videos may lead to highly variable video quality delivery and do not make the most effective use of network data.

Examples of the present disclosure effectively reduce the bandwidth consumption for mobile video streaming while minimizing the impact on users' QoE. It has been suggested that the average data plan for a U.S. cellular customer may be only 2.5 GB per month, while streaming just one-hour of high definition (HD) video can consume as much as 3 GB data. Therefore, the capability to make more efficient use of data while still hitting quality targets may enable users to consume more content within their data budgets without adversely impacting QoE. In addition, downloading less data for a video session also translates to lower radio energy consumption, less thermal overhead on mobile devices, as well as potentially better QoE for other users sharing the same cellular radio access network (RAN) or base station. Some video and network providers offer options for users to exercise control over the amount of data consumed by video streaming. For example, a service-based option may allow a user to limit the highest quality/screen resolution/bitrate track that the ABR logic will download (e.g., stream only standard definition (SD) content on cellular). A network-based option may allow a user to request that the network provider limit the network bandwidth, which indirectly has a similar effect. These approaches primarily focus on data savings and do not achieve a balance between video quality and bandwidth usage or account for the fine-grain characteristics of video encoding.

Examples of the present disclosure provide for quality-aware data-efficient streaming which may be referred to as QUAD (QUality-Aware Data-efficient) streaming. In one example, QUAD streaming comprises a rate adaptation algorithm that uses an optimization framework that explicitly takes into account a user-defined target quality, while also minimizing re-buffering and quality variations, in addition to integrating bandwidth awareness and buffer control. To illustrate, QUAD streaming may take a user-specified target quality as input, and leverage an optimization formulation and feedback control to optimize the QoE metrics while approaching the target quality as closely as possible. QUAD streaming explicitly considers the bandwidth efficiency by matching the quality of video chunks against a pre-defined target quality. In this way, the video player will avoid fetching video chunks whose qualities are too high, leading to bandwidth savings. Evaluations demonstrate that examples of the present disclosure achieve improved tradeoffs between video quality and data usage, exemplified by more consistent quality among successive chunks selected and played by a video player, where the video chunks have qualities closer to desired levels. In addition, examples of the present disclosure achieve less stalls and more efficient data usage as compared to other ABR streaming data-saving schemes.

In ABR encoding schemes for ABR streaming, for each time block of a video, the encoding bitrates for video chunks, and hence picture quality, generally increase from lower bitrate to higher bitrate tracks. During playback, the client/video player downloads a manifest file containing meta-data about the different tracks (and the video chunks of each track) and resource requirements (e.g., peak rate). The ABR logic at the video player dynamically determines which chunk (i.e., from which track) to fetch for each position/time block in the video, which may be based on available network bandwidth and other factors.

Existing ABR schemes do not have access to or do not consider video encoding/perceptual visual quality information. Adaptation decisions to improve QoE are track-based, making a coarse-grained assumption that a higher bitrate track has better visual quality than a lower bitrate track. This fails to account for the existence of significant visual quality variability across chunks and different scenes even within the same track. In addition, existing ABR schemes focus on maximizing the video quality and user QoE, and do not directly attempt to optimize data usage. While some implementations do result in limitations of data usage, such behaviors are driven primarily by QoE impairment concerns. For example, the network bandwidth estimation at the client/video player may not be accurate. Thus, selecting the highest bitrate tracks can increase the chance of stalls. To address this, one ABR scheme may consider only tracks with declared bitrates (e.g., for a given track, set around the peak bitrate of that track) that are at least 25% lower than the estimated network bandwidth. While such a configuration impacts data usage, data efficiency is not a primary factor in making the track selection decision. In addition, as mentioned above, some mobile network operators and commercial video services provide users with certain "data saver" options (which may be track-based, e.g., limit the highest quality/screen resolution/bitrate track, or network-bandwidth-based, e.g., restrict the available network-bandwidth at the direction of the client device/video player).

It is observed that for encoders that are in wide use (e.g., H.264 and H.265 encoders, VP9 encoders, AV1 (AOMedia Video 1) format encoders, etc.), the perceived quality exhibits significant variability across different chunks within the same track, for both constant bitrate (CBR) and variable bitrate (VBR) encodings. Therefore, a data-saving approach that removes the highest bitrate tracks may inevitably lead to quality variations. For instance, a simple scene may be streamed and played-out at an unnecessarily high quality and a complex scene at a much lower quality. Such quality variability impairs users' QoE, and makes suboptimal use of network data. It is also observed that diminishing returns are achieved with increasing encoding bitrates; as bitrate increases, quality improvements become progressively smaller.

As mentioned above, examples of the present disclosure (e.g., QUAD streaming) may comprise an optimization framework that explicitly takes into account a user-defined target quality (perceptual visual quality), while also minimizing re-buffering and quality variations, in addition to integrating bandwidth awareness and buffer control. To illustrate, QUAD streaming may take a user-specified target perceptual visual quality as input, and leverage an optimization formulation and feedback control to optimize the QoE metrics while approaching the target perceptual visual quality as much as possible. QUAD explicitly considers the bandwidth efficiency by matching the perceptual visual quality of video chunks against a pre-defined target perceptual visual quality.

In this regard it should be noted that examples of the present disclosure may implement an adaptive video streaming system in which a video server may provide a manifest file for a video to a client/video player in which the manifest file indicates a plurality of video chunks associated with each time block of the video as well as perceptual visual qualities of the plurality of video chunks associated with each time block of the video. In one example, the plurality of video chunks for each time block of the video may be of different tracks. In other words, the adaptive video streaming may be adaptive bitrate (ABR) streaming, where each video is comprised of different tracks, each track encoded in accordance with a target or nominal encoding bitrate. In this case, the manifest file may indicate the track to which each of the plurality of video chunks of each time block belongs. In addition, the manifest file may indicate for each video chunk: a URL or other indicators of where and/or how the client/video player may obtain the chunk, the data size/volume of the chunk, the playback duration of the chunk, and so forth. However, examples of the present disclosure are not limited to track-based ABR streaming. For instance, each time block of a video program may be associated with multiple video chunks, each with a different perceptual visual quality, while the chunks of the same or similar encoding bitrates for successive time blocks of the video may not be organized into "tracks" per se.

In one example, the perceptual visual quality of each video chunk associated with a time block of a video may be determined, and the perceptual visual quality may then be stored as metadata along with the respective video chunk, e.g., at one or more network-based servers of a streaming video service. To illustrate, a network-based server may apply an automated evaluation metric to determine a quantitative score, or perceptual visual quality for each video chunk. For instance, the perceptual visual quality may be calculated/assigned in accordance with a peak signal-to-noise ratio (PSNR), a Video Multi-method Assessment Fusion (VMAF), a structural similarity (SSIM) index, or the like, which may evaluate each chunk in an automated manner and assign a numeric score of perceptual visual quality on a given scale. When each video chunk is identified to a client/video player in a manifest file, the associated perceptual visual quality for the video chunk may therefore be included as additional information.

In one example, the present disclosure optimizes and balances conflicting objectives: matching the available bandwidth and matching a target perceptual visual quality. For instance, matching of the available bandwidth may comprise selecting a video chunk for a given time block of the video (from among a plurality of video chunks for the time block that have different encoding bitrates) that minimizes the difference between the available network bandwidth and bandwidth requirement of the selected video chunk. On the other hand, matching the target perceptual visual quality may comprise minimizing the difference between the perceptual visual quality of the selected video chunk and the target perceptual visual quality. In one example, the present disclosure may further optimize and balance with regard to a third objective: to maintain a more consistent perceptual visual quality among adjacent chunks for smoother playback. For instance, maintaining consistent quality may comprise minimizing perceptual visual quality changes between two adjacent video chunks that are selected by a client device/video player (e.g., for adjacent time blocks of the video).

In one example, the present disclosure may also incorporate a feedback control unit to maintain a minimum buffer occupancy level of a buffer of client device/video player, e.g., in order to avoid stalls and re-buffering. For instance, in one example, the feedback control may comprise a proportional-integral-derivative (PID) control unit that monitors (on a continuous or near-continuous basis (e.g., an ongoing, periodic basis)) the difference between the target and current buffer levels of the video player, and adjusts a control signal to maintain the target buffer level, which helps to avoid stalls. In other examples, similar control methods may be used to maintain the buffer level (also referred to as the "buffer occupancy" or "buffer occupancy level").

In one example, the present disclosure may incorporate a joint/multi-factor optimization according to Equation 1 (an objective function):

$$J(l_t) = \|\max(0, u_t R_t(l_t) - \hat{C}_t)\|^2 + \alpha \|Q_r - Q_t(l_t)\|^2 + \eta \|Q_t(l_t) - Q_{t-1}(l_{t-1})\|^2$$

In Equation 1, $u_t$ is a control policy factor, $R_t(l_t)$ is the bitrate of a video chunk, $\hat{C}_t$ is the network bandwidth, $Q_t(l_t)$ is the perceptual visual quality of the video chunk, $Q_r$ is the target perceptual visual quality, and $Q_{t-1}(l_{t-1})$ is the perceptual visual quality of the preceding video chunk (e.g., for the immediately prior and adjacent time block of the video). $J(l_t)$ is a metric for a particular video chunk $l_t$. The video player may select the video chunk from among a plurality of video chunks available for a given time block t with the lowest metric value (that minimizes the objective function $J(l_t)$).

Notably, the first term of Equation 1 considers the difference between the available network bandwidth and the bandwidth requirement of the selected track (i.e., the selected video chunk/bitrate variant for the time block t of the video). The second term of Equation 1 is dependent upon how much the perceptual visual quality of the selected video chunk deviates from the target perceptual visual quality. The sum of the first and second terms allows the chosen video chunk to be as close to the target quality as possible, without overly exceeding the network bandwidth (to avoid stalls). The third and last term of Equation 1 penalizes quality changes between two adjacent chunks, in order to maintain a more consistent quality and smooth playback.

The factors $\alpha$ and $\eta$ may be tuned to achieve a desired balance between smooth playback, adherence to the target perceptual visual quality, and/or a minimization or at least a reduction of data usage. In one example, the third term may be omitted and the QUAD streaming logic at a client/video player may balance the first two factors without consideration to the consistency of quality between adjacent video chunks for adjacent time blocks. Note that the first term is of a different unit from the second and third terms. In one example, all three terms may be unitless as follows: the first term is normalized by the estimated bandwidth, and the other two terms are normalized by target quality (the maximum quality is approximately the target quality). In one example, the control policy factor, $u_t$, is PID-based and jointly considers the proportional and integral control parts, a target buffer level, and a current buffer level. In addition, an indicator function may be included, which makes the feedback control system linear, and hence easier to control and analyze.

To further reduce occurrences of re-buffering and stalls, when the buffer occupancy is low, the QUAD streaming logic at a client/video player may select video chunks of low perceptual visual quality and/or with low encoding bitrates. For instance, if the buffer occupancy is less than 4 chunks duration, the client/video player may be configured to select chunks for subsequent time blocks from among chunks having the two lowest encoding bitrates available. In other words, when the current buffer level is low (and hence there is a risk of re-buffering), the goals of achieving the target quality and reducing quality changes (i.e., the last two terms in Equation 1) may be ignored, and only the first term of Equation 1 may be considered (to reduce the risk of stalls). In that case, the video chunk may be selected based on estimated bandwidth. In one example, if $l_f$ (the maximum level/track of a video chunk to be selected under low buffer occupancy conditions) is set to 2, then the client/video player may select a video chunk from a level/track according to Equation 2:

$$l_t = \min(l_f, \hat{C}_t/u_t)$$

In Equation 2, $u_t$ is the control policy factor, $\hat{C}_t$ is the network bandwidth, and $l_t$ is the video chunk to be selected (denoted as the "level" or track number).

In one example, the present disclosure may include or be used in conjunction with server-side chunk-based filtering (CBF). For instance, a user, or the client device may inform a video server of the desired target perceptual visual quality, which is measured by robust perceptual video/image quality metrics such as VMAF. For every time block in the video, CBF limits the choice of the highest quality video chunk to the video chunk whose quality is nearest to the user-set target quality. For instance, the server may send a manifest file to the client device that omits any higher quality chunks which exceed the target perceptual visual quality. From the client/video player perspective, it is as if the higher quality chunks/bitrate variants did not exist. As such, the client/video player implementing QUAD streaming may work with a set of more desirable choices of video chunks for each time block of a video (both from quality and bandwidth usage perspectives), which may thereby help the client/video player to achieve further improved streaming performance. In addition, in various examples, the present disclosure may also be used in conjunction with other data saving techniques, such as network-based bandwidth limitation techniques, track-based limitations, and so forth.

It should be noted that QUAD streaming provides improved QoE and better tradeoffs in approaching the target quality with small quality variations, as compared to existing ABR schemes. For instance, it is observed that as compared to two popular existing ABR schemes, QUAD streaming may reduce the deviation from the target quality by 36%-43%, reduce the tail of low-quality chunks by 54%-59%, reduce the average quality change by 43%-44%, reduce the duration of stalls by 98%-99% on average, and reduce overall data usage by 25%-32%.

It should also be noted that although examples of the present disclosure are described primarily in connection with a video client and video streaming, examples of the present disclosure may be similarly applied to other types of streaming media, such as adaptive bitrate streaming audio. In addition, aspects of the present disclosure are equally applicable to live video streaming and on-demand streaming of recorded video programs, as well as to both CBR and VBR encoding of video chunks. Similarly, although aspects of the present disclosure may be focused upon streaming via cellular networks, the present disclosure is also applicable to other types of networks and network infrastructure, including wired or wireless networks (e.g., home broadband), and so forth. These and other aspects of the present disclosure are described in greater detail below in connection with the examples of FIGS. 1-3.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by the same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of the mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

In one example, application servers 114 may include data storage servers to receive and store manifest files regarding chunk-based multi-encoded videos (e.g., track-based or non-track-based multi-bitrate encoded videos for adaptive video streaming, adaptive bitrate video streaming, etc. and/or videos that are represented, e.g., for a given video, as multiple video chunks encoded at multiple perceptual visual quality levels for each time block of the video), maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of chunk-based multi-encoded videos. In one example, each of the servers 149 may also make available manifest files which describe the variants of a video and the segments/video chunks thereof which are stored on the respective one of the servers 149. For instance, there may be several video chunks containing video and audio for the same time block (e.g., a portion of 2-10 seconds) of the video, but which are encoded at different bitrates in accordance with an adaptive bitrate streaming protocol and/or which have different perceptual visual qualities. Thus, streaming video player (e.g., an ABR streaming video player, and/or a video player that may be configured to provide QUAD streaming as described herein) may request and obtain any one of the different video chunks for the time block, e.g., in accordance with QUAD streaming logic and depending upon a user-selected target perceptual visual quality, depending upon the perceptual visual qualities of available video chunks for the time block, depending upon a state of a video buffer, depending upon network bandwidth or other network conditions, depending upon the access rights of the streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 2:
FIG. 2 illustrates a flowchart of an example method for selecting a video chunk from among a plurality of video chunks associated with a first time block of a video in accordance with a designated perceptual visual quality.

In one example, one or both of the STB/DVR 162A and STB/DVR 162B may comprise all or a portion of a computing device or system, such as computing system 300, and/or processing system 302 as described in connection with FIG. 3 below, specifically configured to perform various steps, functions, and/or operations for selecting a video chunk from among a plurality of video chunks associated with a first time block of a video in accordance with a designated perceptual visual quality. Among other functions, STB/DVR 162A and STB/DVR 162B may comprise streaming video players (e.g., QUAD streaming-configured video players) capable of streaming and playing multi-encoded videos in formats such as H.264 (Advanced Video Coding (AVC)), H.265 (High Efficiency Video Coding (HEVC)), Moving Picture Expert Group (MPEG).mpeg files, .mov files, .mp4 files, 0.3gp files, .f4f files, .m3u8 files, or the like. A flowchart of an example method of selecting a video chunk from among a plurality of video chunks associated with a first time block of a video in accordance with a designated perceptual visual quality is illustrated in FIG. 2 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for selecting a video chunk from among a plurality of video chunks associated with a first time block of a video in accordance with a designated perceptual visual quality, as described herein, and may comprise a QUAD streaming-configured video player capable of streaming and playing multi-encoded videos. For instance, one or more of mobile devices 157A, 157B, 167A and 167B, and/or PC 166 may also comprise all or a portion of a computing device or system, such as computing system 300, and/or processing system 302 as described in connection with FIG. 3 below, specifically configured to perform various steps, functions, and/or operations for selecting a video chunk from among a plurality of video chunks associated with a first time block of a video in accordance with a designated perceptual visual quality, as described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from the core network 110. In another example, CDN 170 may be operated by the same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or system, such as computing system 300, and/or processing system 302 as described in connection with FIG. 3 below, specifically configured to perform various steps, functions, and/or operations in connection with selecting a video chunk from among a plurality of video chunks associated with a first time block of a video in accordance with a designated perceptual visual quality.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 300, and/or processing system 302 as described in connection with FIG. 3 below, specifically configured to perform various steps, functions, and/or operations in connection with selecting a video chunk from among a plurality of video chunks associated with a first time block of a video in accordance with a designated perceptual visual quality, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client/QUAD streaming-configured video player for requesting and receiving a manifest file for a multi-encoded video, as described herein. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file and in accordance with QUAD streaming logic (e.g., as described in connection with the method 200 of FIG. 2, and as described elsewhere herein). In one example, one or more of application servers 114 and/or STB/DVR 162A may also assemble the manifest file or generate a client-specific manifest file that accounts for the user selected target perceptual visual quality. For instance, any one or more of application servers 114 and/or STB/DVR 162A may comprise a processing system that implements chunk-based filtering (CBF), e.g., wherein the manifest file provided to a client device omits any chunks that exceed the target perceptual visual quality.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from the origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

It should also be noted that in accordance with the present disclosure, any one or more devices of system 100 may perform operations for generating different video chunks/bitrate variants for time blocks of a video and/or for generating different tracks of a video (e.g., ABR encoders or the like), for determining and tagging video chunks with perceptual visual qualities, for generating a manifest file for the video (which in some examples may also include chunk-based filtering (CBF), and so on, such as one or more of application servers 114, TV servers 112, ingest server 172, edge server 174, one or more of servers 149, and so forth. For instance, any one or more of such devices may comprise a processing system to create, store, and/or stream video chunks for variants of ABR videos (or non-ABR multi-encoded videos), as well as to perform other functions.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for selecting a video chunk from among a plurality of video chunks associated with a first time block of a video in accordance with a designated perceptual visual quality, in accordance with the present disclosure. In one example, the method 200 is performed by an video player/client device, e.g., STB/

DVR 162A, STB/DVR 162B, one of the TVs 163A or 163B, PC 166, one of the mobile devices 157A, 157B, 167A, or 167B, and so forth, or any one or more components thereof, such as a processing system, or by one of these devices in conjunction with other devices and/or components of network 100 of FIG. 1. In one example, the steps, functions, or operations of method 200 may be performed by a computing device or system 300, and/or a processing system 302 as described in connection with FIG. 3 below. For instance, the computing device 300 may represent any one or more components of a client device that is/are configured to perform the steps, functions and/or operations of the method 200. For illustrative purposes, the method 200 is described in greater detail below in connection with an example performed by a processing system, such as processing system 302. The method 200 begins in step 205 and proceeds to optional step 210 or to step 220.

At optional step 210, the processing system may obtain a selection of a video for streaming. For instance, the processing system may comprise an endpoint device/client device, e.g., a mobile phone, tablet, laptop computer, desktop computer, set-top-box, smart TV, etc. (or at least a portion thereof) that interacts with a streaming video server and that provides a user interface which may present various videos available for streaming (e.g., via a display screen). The user interface may also provide for receiving user selection(s) of video(s) and playing-out video chunks of the video(s) that are obtained by the client device, receiving and executing commands to pause, rewind, and fast forward, and so forth.

At step 220, the processing system may obtain a selection of a designated perceptual visual quality for the video. For instance, the processing system (e.g., of an endpoint/client device comprising a streaming video player) may obtain a user input via a user interface of a video player application providing for the selection of the designated perceptual visual quality. In one example, the user interface may give options of "high," "medium," and "low," may provide a slider bar, a dial, or the like, where the processing system may map the user input to the designated perceptual visual quality (for instance, the user interface may not present the actual perceptual visual quality scale to the user).

At optional step 230, the processing system may obtain a manifest file of the video. For example, the processing system may request and receive the manifest file of the video from a video server associated with a streaming video service. The manifest file may identify a plurality of video chunks associated with a first time block of the video (in addition to video chunks associated with various other time blocks of the video, e.g., all of the time blocks of the video). Each of the plurality of video chunks may represent the same visual information of the first time block of the video. In one example, each of the plurality of video chunks is associated with a different track of a plurality of tracks of the video program according to an adaptive bitrate (ABR) streaming protocol. For instance, each of the plurality of tracks is encoded at a different encoding bitrate. In other words, all of the video chunks of the same track are encoded at the same nominal/target encoding bitrate. It should be noted that each of the plurality of video chunks associated with the first time block of the video may be encoded at a different encoding bitrates. In one example, these video chunks may be uniquely associated with different tracks and hence different encoding bitrates. However, in another example, the plurality of video chunks may be encoded at different encoding bitrates, but may not necessarily be associated with "tracks" per se.

The manifest file may also identify perceptual visual qualities of the plurality of video chunks associated with the first time block of the video as well as data volumes of the plurality of video chunks associated with the first time block of the video. In one example, the designated perceptual visual quality and perceptual visual qualities of the plurality of chunks are in accordance with at least one of a peak signal-to-noise ratio (PSNR) metric, a video multi-method assessment fusion (VMAF), or a structural similarity (SSIM) index.

The manifest file may also identify for each video chunk: a URL or other indicators of where and/or how the client/video player may obtain the video chunk, the playback duration of the chunk, and so forth. In one example, optional step 230 is performed in response to the selection(s) obtained at optional step 210 and/or step 220. It should also be noted that the term "first" does not necessarily denote that the first time block is a beginning time block a video, although in one example it may be so.

At step 240, the processing system selects a video chunk from among a plurality of video chunks associated with a first time block of the video, based upon a manifest file of the video. For instance, the manifest file of the video may be obtained at optional step 220. In one example, the selecting is in accordance with the designated perceptual visual quality obtained at step 210. For example, each of the plurality of video chunks may be associated with a respective perceptual visual quality. In addition, in one example, the perceptual visual qualities for each video chunk may be indicated in the manifest file.

In one example, step 240 may comprise selecting the video chunk from among the plurality of video chunks that has a least difference between the designated perceptual visual quality and a perceptual visual quality of the video chunk. In one example, step 240 may comprise selecting the video chunk from among the plurality of video chunks in accordance with a joint minimization of (1) a difference between the designated perceptual visual quality and the perceptual visual quality of the video chunk, and (2) a difference between an available network bandwidth and a bandwidth requirement of the video chunk. For instance, step 240 may comprise a minimization (or at least a reduction) of a metric in accordance with at least the first two terms of Equation 1 above. In one example, the bandwidth requirement may be based upon a data volume of the video chunk and a control policy factor. For instance, the control policy factor may be in accordance with a proportional-integral-derivative (PID) feedback control, or a similar feedback control methodology.

In one example, step 240 may comprise selecting the video chunk from among the plurality of video chunks in accordance with a joint/multi-factor minimization of: the difference between the designated perceptual visual quality and the perceptual visual quality of the video chunk, the difference between the available network bandwidth and the bandwidth requirement of the video chunk, and a difference between the perceptual visual quality of the video chunk and a perceptual visual quality of another video chunk of the video associated with a second time block that is a next preceding time block of the video program before the first time block. For instance, in one example, step 240 may be in accordance with Equation 1 above.

In one example, the control policy factor is further applied to maintain a minimum occupancy level of a buffer (the video buffer of the client device/video player). For instance, under low buffer occupancy conditions (e.g., at or below a threshold buffer occupancy), the control policy factor may be further applied in accordance with Equation 2 above to select a low quality video chunk (which comprises less data volume and requires less bandwidth to download as compared to higher quality video chunks). In other words, step 240 may alternatively or additionally include detecting that a buffer occupancy is below a threshold buffer occupancy, and overriding the joint and/or multi-factor selection criteria. For instance, the processing system may select a video chunk having a low quality (e.g., a low encoding bitrate) in order to help fill the buffer quickly.

At step 250, the processing system obtains the video chunk from a server (e.g., via one or more links over one or more networks). For instance, in one example, the processing system may request the video chunk in accordance with a URL or other identifiers of the video chunk from a manifest file or the like for the video. In one example, the video chunk may be requested from a same source as other video chunks of the video (e.g., for different time blocks preceding or following the first time block). In another example, the video chunk may be stored on another device or system from which the processing system may request the video chunk. The video chunk may be sent by the server to the processing system (e.g., to the client device/video player) via the same or different network links over which the request may be submitted.

At step 260, the processing system records the video chunk in a buffer (e.g., a video buffer of the client device/video player). For example, the video buffer may comprise a portion of a memory of a device of the processing system or may be otherwise associated with the processing system. The video chunk and/or portions thereof (e.g., groups of one or more frames) may be recorded in the video buffer in the order received, or may be reordered in an order for presentation/playback. For instance, each video chunk may be tagged with a time block indicator, and/or frames thereof may be tagged with frame numbers indicating each frame's order or position within a sequence of frames, e.g., within the video chunk or time block, and/or within the overall video.

Following step 260, if there are any additional time blocks of the video for which a video chunk is to be selected, obtained, etc., the method 200 may return to step 240. For example, the obtaining and recording of the video chunk at steps 250 and 260 may be performed at a time prior to when the processing system is ready to play the video chunk. Therefore, the method 200 may include selecting, obtaining, and recording one or more additional video chunks (e.g., for subsequent time blocks) prior to the actual presentation of the video chunk of the first time block via a display. Otherwise, the method 200 may proceed to optional step 270 or to step 295.

At optional step 270, the processing system may retrieve the video chunk from the buffer. For example, the obtaining and recording of the video chunk at steps 250 and 260 may be performed at a time prior to when the processing system is ready to play the video chunk. Thus, the video chunk may be temporarily stored in the buffer until the presentation of the video reaches the first time block. In one example, optional step 270 may include rendering the video chunk for display. For instance, if the video chunk comprises frames that are interframe encoded, the processing system may apply a decoder logic to render the frames in a format that is ready for presentation via a display.

At optional step 280, the processing system may present the video chunk via a display. For example, the processing system may route decoded frames of the video chunk to a display which may present the frames to a user. In one example, the display may be part of the processing system. In another example, the display may comprise a unique component and/or may be part of a different device.

Following optional step 280, if there are any additional time blocks of the video for which a video chunk is to be selected, obtained, stored, played, etc., the method 200 may return to step 240. Otherwise, the method 200 may proceed to step 295. At step 295 the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as for additional time blocks of the video or for a different video, or in response to a command to change the designated perceptual visual quality. For instance, upon pausing the presentation/display of the video, a user may be provided with an option to change the designated perceptual visual quality. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for selecting a video chunk from among a plurality of video chunks associated with a first time block of a video in accordance with a designated perceptual visual quality, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for selecting a video chunk from among a plurality of video chunks associated with a first time block of a video in accordance with a designated perceptual visual quality (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for selecting a video chunk from among a plurality of video chunks associated with a first time block of a video in accordance with a designated perceptual visual quality (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   obtaining, by a processing system including at least one processor, a selection of a designated perceptual visual quality for a video;
   selecting, by the processing system, a video chunk from among a plurality of video chunks associated with a first time block of the video, based upon a manifest file of the video, wherein the selecting is in accordance with the designated perceptual visual quality, wherein each of the plurality of video chunks is associated with a respective perceptual visual quality, and wherein the selecting is further in accordance with an objective function:

$$J(l_t) = \|\max(0, u_t R_t(l_t) - \hat{C}_t)\|^2 + \alpha \|Q_r - Q_t(l_t)\|\mu^2,$$

where $u_t$ is a control policy factor, $R_t(l_t)$ is a bitrate of a given video chunk, $\hat{C}_t$ is a network bandwidth, $Q_t(l_t)$ is a perceptual visual quality of the given video chunk, $Q_r$ is the designated perceptual visual quality, $\alpha$ comprises a tunable factor, and $J(l_t)$ is a metric for the given video chunk $l_t$, wherein a given video chunk from among the plurality of video chunks having the lowest value of the metric $J(l_t)$ is selected as the video chunk;
   obtaining, by the processing system, the video chunk from a server; and
   recording, by the processing system, the video chunk in a buffer.

2. The method of claim 1, further comprising:
   obtaining a selection of the video.

3. The method of claim 1, further comprising:
   obtaining the manifest file of the video, wherein the manifest file identifies: the plurality of video chunks associated with the first time block of the video, perceptual visual qualities of the plurality of video chunks associated with the first time block of the video, and data volumes of the plurality of video chunks associated with the first time block of the video.

4. The method of claim 1, wherein the selecting comprises:
   selecting the video chunk from among the plurality of video chunks that has a least difference between the designated perceptual visual quality and a perceptual visual quality of the video chunk.

5. The method of claim 4, wherein the selecting further comprises:
   selecting the video chunk from among the plurality of video chunks in accordance with a joint minimization of a difference between the designated perceptual visual quality and the perceptual visual quality of the video chunk and a difference between an available network bandwidth and a bandwidth requirement of the video chunk.

6. The method of claim 5, wherein the bandwidth requirement of the video chunk is based upon a data volume of the video chunk and a control policy factor.

7. The method of claim 6, wherein the control policy factor is in accordance with a proportional-integral-derivative feedback control.

8. The method of claim 6, wherein the control policy factor is applied to maintain a minimum occupancy level of the buffer.

9. The method of claim 5, wherein the selecting further comprises:
  selecting the video chunk from among the plurality of video chunks in accordance with a joint minimization of:
    the difference between the designated perceptual visual quality and the perceptual visual quality of the video chunk;
    the difference between the available network bandwidth and the bandwidth requirement of the video chunk; and
    a difference between the perceptual visual quality of the video chunk and a perceptual visual quality of another video chunk of the video associated with a second time block that is a next preceding time block of the video before the first time block.

10. The method of claim 1, wherein the plurality of video chunks represents a same visual information of the first time block of the video.

11. The method of claim 1, wherein each of the plurality of video chunks is associated with a different track of a plurality of tracks of the video according to an adaptive bitrate streaming protocol.

12. The method of claim 11, wherein each of the plurality of tracks is encoded at a different encoding bitrate.

13. The method of claim 1, wherein each of the plurality of video chunks associated with the first time block of the video is encoded at a different encoding bitrate.

14. The method of claim 1, further comprising:
  retrieving the video chunk from the buffer; and
  presenting the video chunk via a display.

15. The method of claim 1, wherein the designated perceptual visual quality and perceptual visual qualities of the plurality of video chunks are in accordance with at least one of:
  a peak signal-to-noise ratio metric;
  a video multi-method assessment fusion; or
  a structural similarity index.

16. The method of claim 1, wherein the processing system comprises a processing system of an endpoint device.

17. A device comprising:
  a processing system including at least one processor; and
  a computer-readable medium storing instructions which, when executed by the processing system, cause the processing system to perform operations, the operations comprising:
    obtaining a selection of a designated perceptual visual quality for a video;
    selecting a video chunk from among a plurality of video chunks associated with a first time block of the video, based upon a manifest file of the video, wherein the selecting is in accordance with the designated perceptual visual quality, wherein each of the plurality of video chunks is associated with a respective perceptual visual quality, and wherein the selecting is further in accordance with an objective function:

$$J(l_t) = \|\max(0, u_t R_t(l_t) - \hat{C}_t)\|^2 + \alpha \|Q_r - Q_t(l_t)\|^2,$$

where $u_t$ is a control policy factor, $R_t(l_t)$ is a bitrate of a given video chunk, $\hat{C}_t$ is a network bandwidth, $Q_t(l_t)$ is a perceptual visual quality of the given video chunk, $Q_r$ is the designated perceptual visual quality, $\alpha$ comprises a tunable factor, and $J(l_t)$ is a metric for the given video chunk $l_t$, wherein a given video chunk from among the plurality of video chunks having the lowest value of the metric $J(l_t)$ is selected as the video chunk;
    obtaining the video chunk from a server; and
    recording the video chunk in a buffer.

18. A non-transitory computer-readable medium storing instructions which, when executed by a processing system including at least one processor, cause the processing system to perform operations, the operations comprising:
  obtaining a selection of a designated perceptual visual quality for a video;
  selecting a video chunk from among a plurality of video chunks associated with a first time block of the video, based upon a manifest file of the video, wherein the selecting is in accordance with the designated perceptual visual quality, wherein each of the plurality of video chunks is associated with a respective perceptual visual quality, and wherein the selecting is further in accordance with an objective function:

$$J(l_t) = \|\max(0, u_t R_t(l_t) - \hat{C}_t)\|^2 + \alpha \|Q_r - Q_t(l_t)\|^2,$$

where $u_t$ is a control policy factor, $R_t(l_t)$ is a bitrate of a given video chunk, $\hat{C}_t$ is a network bandwidth, $Q_t(l_t)$ is a perceptual visual quality of the given video chunk, $Q_r$ is the designated perceptual visual quality, $\alpha$ comprises a tunable factor, and $J(l_t)$ is a metric for the given video chunk $l_t$, wherein a given video chunk from among the plurality of video chunks having the lowest value of the metric $J(l_t)$ is selected as the video chunk;
  obtaining the video chunk from a server; and
  recording the video chunk in a buffer.

19. The non-transitory computer-readable medium of claim 18, the operations further comprising:
  obtaining a selection of the video.

20. The non-transitory computer-readable medium of claim 18, the operations further comprising:
  obtaining the manifest file of the video, wherein the manifest file identifies: the plurality of video chunks associated with the first time block of the video, perceptual visual qualities of the plurality of video chunks associated with the first time block of the video, and data volumes of the plurality of video chunks associated with the first time block of the video.

* * * * *